Nov. 14, 1939.   W. EGLINTON ET AL   2,179,817
CAMERA BLIMP
Filed March 31, 1936     3 Sheets-Sheet 1

INVENTOR
WILLIAM EGLINTON
HARRY G. CUNNINGHAM
BY
ATTORNEY

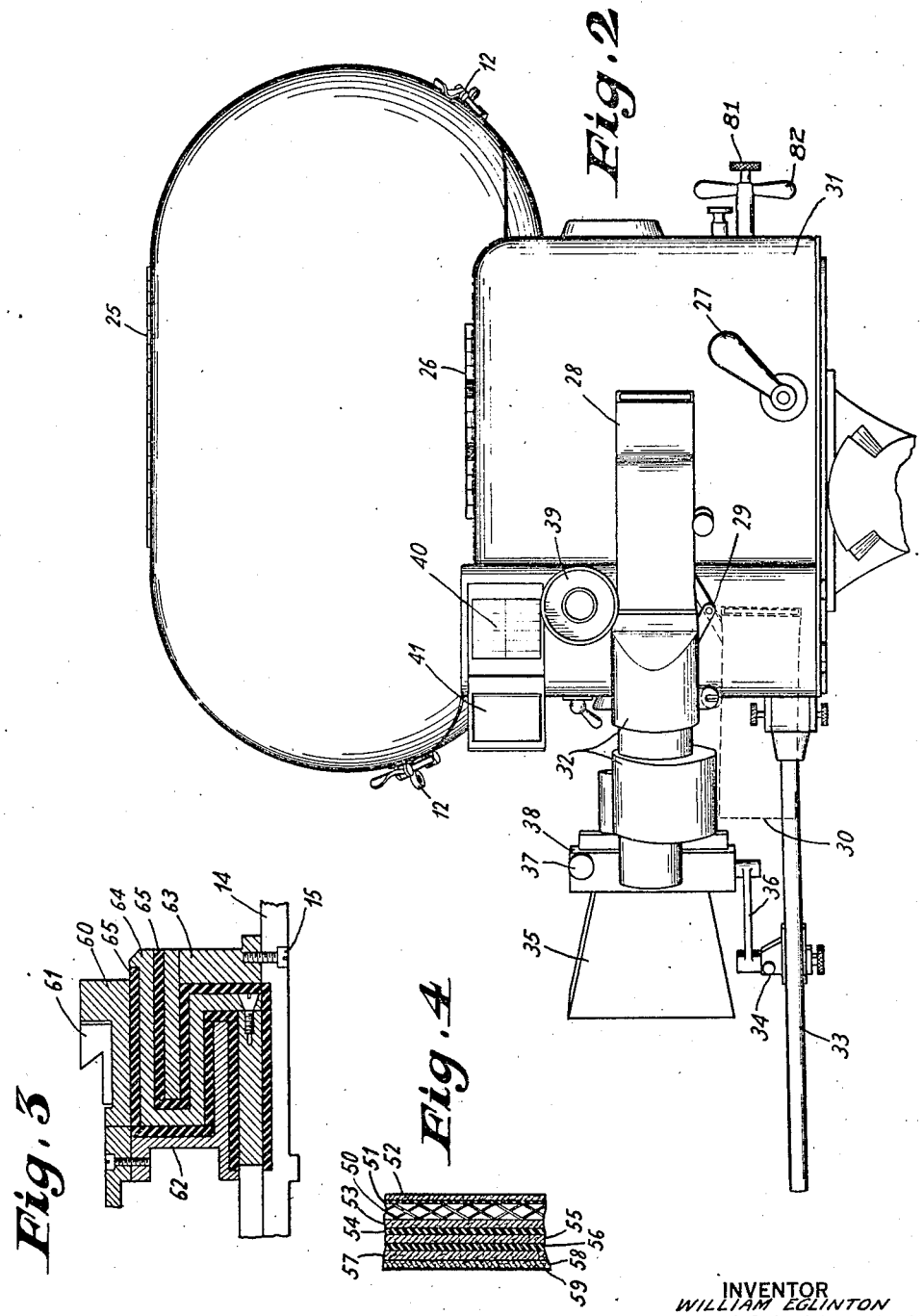

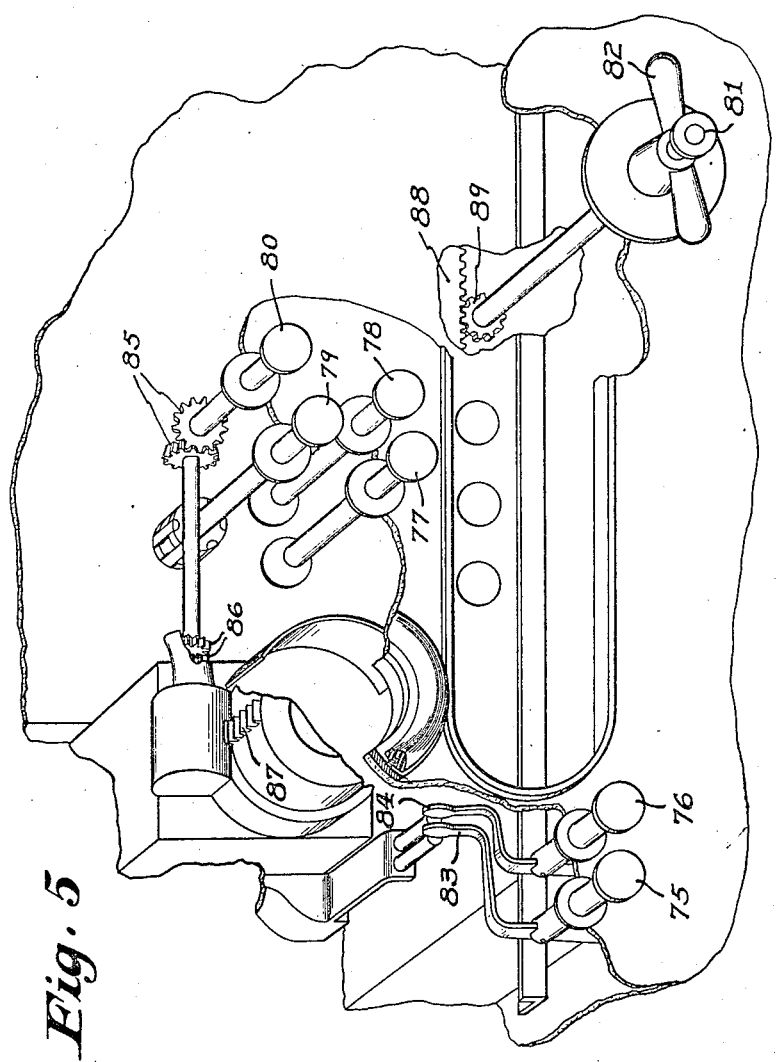

Patented Nov. 14, 1939

2,179,817

UNITED STATES PATENT OFFICE 2,179,817

CAMERA BLIMP

William Eglinton, Reseda, and Harry G. Cunningham, Los Angeles, Calif., assignors to R. K. O. Studios, Inc., a corporation of Delaware Application March 31, 1936, Serial No. 71,864

5 Claims. (Cl. 88—17)

The present invention relates to camera blimps, and more particularly to a variety thereof peculiarly adapted for use in conjunction with motion picture cameras for making talking motion pictures or other motion pictures wherein the sound is recorded simultaneously with the photographing of the picture.

The invention involves a novel wall construction for a camera blimp as well as a novel mechanical construction for the accessories appended to the outside thereof and such attachments as are required to actuate the camera therewithin without opening the section of the blimp which is fastened by clamps.

This application is closely related to the application of Harry G. Cunningham, filed March 31, 1936, Serial No. 71,823, entitled "Camera adjusting mechanism", pertaining to a novel apparatus for focussing the lens of a camera enclosed within a blimp.

One object of the present invention is to provide a camera blimp which is as nearly soundproof as is commercially practicable.

Another object of the invention is to provide a blimp wherein the belt drive to the film take-up reel is readily accessible.

Another object of the invention is to provide such a device in which the drive motor for the camera is readily accessible.

Another object of the invention is to provide such a device wherein the entire camera is readily accessible for inspection or adjustment.

Another object of the invention is to provide such a mechanism wherein the necessary portions of the camera are readily accessible for film reloading and threading.

Another object of the invention is to provide such a mechanism wherein each of the controls of the camera can be actuated from the exterior of the blimp with the same ease as a camera without a blimp.

In general the objects of our invention may be summarized as the provision of a camera blimp within which the camera may be mounted with the same accuracy and operated with the same facility as it would be mounted and operated if no such device were appended thereto.

Referring now to the drawings, Figure 1 is a view from the rear right-hand corner of our blimp as applied to a camera.

Figure 2 is a view from the left-hand side thereof.

Figure 3 is a detailed section of the construction at one of the lower corners of the device.

Figure 4 is a typical wall section and

Figure 5 is a perspective detail of the control mechanism at the rear of the blimp.

Figure 1:
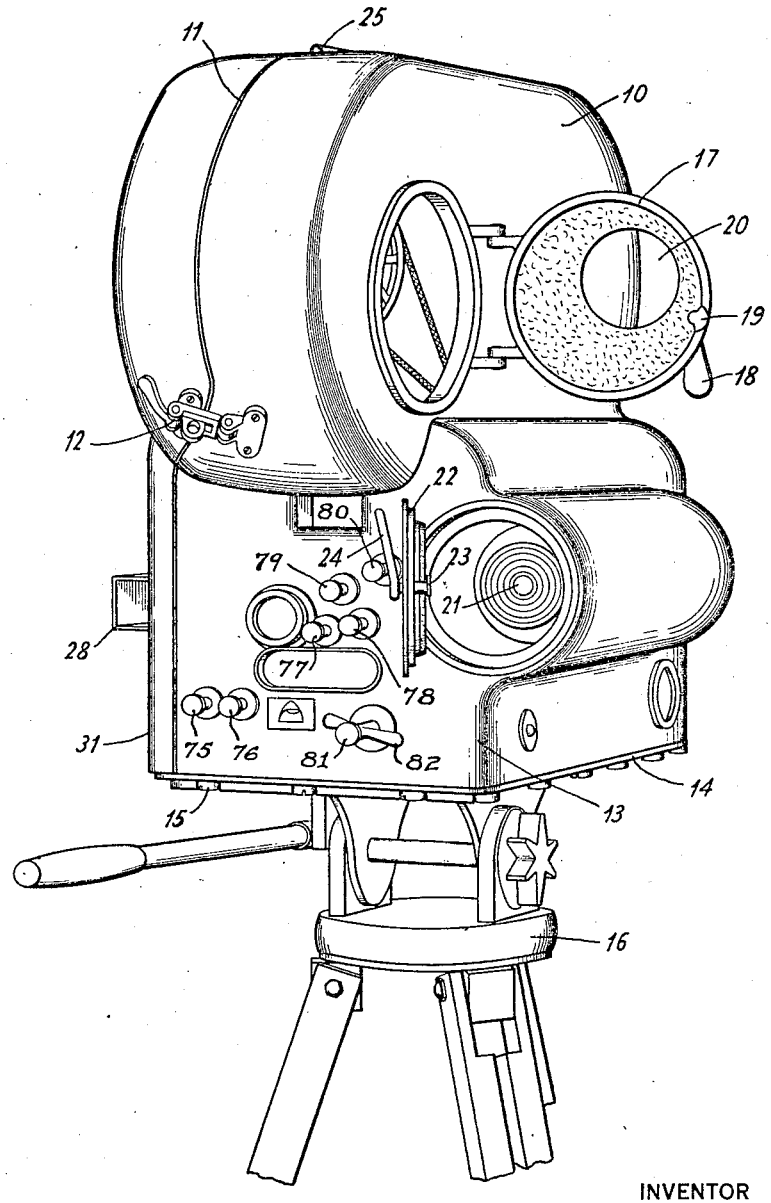

Referring now to the drawings, Figure 1: The housing 10 of the blimp is composed of a composite material shown in more detail in Fig. 4 and formed to an appropriate configuration containing all the mechanical elements of the camera. This casing is made in several sections, the two main sections thereof being divided along the line 11 and secured together when in operative position by appropriate clamps 12. The larger portion of the casing 13 is affixed to a base plate 14 by screws 15 and this base plate in turn is supported upon the customary tripod of any conventional type 16. This tripod is, of course, provided with any usual type of mechanism for manipulating a camera without a blimp which is equally applicable to a camera enclosed in the device of our invention. The belt to the take-up reel is customarily located at the top of a motion picture camera and is readily accessible through the door 17 which is secured by the handle 18 and the clamp 19 and the reel pulley is visible through the window 20 in the door 17 when it is closed.

The camera motor 21 is similarly readily accessible by opening the door 22 secured by the clamp 23 which is actuated by the handle 24. The upper portion of the left-hand side of the housing is secured to the main portion 13 by a hinge 25. The lower portion of the left-hand side of the housing is similarly secured to the upper portion by hinge 26 (Figure 2) which is secured in closed position by a clamp attached to the handle 27. A finder 28 is provided and secured to the left-hand side of the device in the relation to the camera in which a finder is ordinarily secured. As shown in detail in Fig. 2, this finder is made in two sections, hinged at 29, permitting the rear portion of the finder to be folded to the position indicated at 30 in this figure so that the lower left-hand portion of the casing 31 may be opened without interference from the finder. The forward portion 32 of the finder is secured to the blimp by means allowing for appropriate adjustment thereof to correct for parallax between the finder and the optical axis of the camera.

The front of the blimp is provided with appropriate supporting means 33 for guiding a supporting mechanism 34 which is adapted to adjustably support a mask box 35 of any usual or convenient kind. This mask box is laterally adjustable by means of the link 36 and is rotatable by means of the clamp-screw 37. The lens of the camera is fixed by means of the knob 39 which is connected in any appropriate manner to the lens of the camera and which is also connected to a focussing scale 40 from which the operator may ascertain the focal adjustment of the lens. A mirror 41 is provided which, when swung into proper position, permits the operator to view the scale 40 convenient to the several controls thereof. Such a scale or multiplicity of scales, corresponding to an equivalent number of lenses, is used to register the focus of the lens system in feet.

An appropriate mechanism for concurrently adjusting the lens, the scale and the finder is described and claimed in the aforesaid concurrently filed application Serial No. 71,823 but any equivalent mechanism or other appropriate mechanism may be used which is capable of accomplishing the aforesaid adjustments.

The frame of the blimp is composed of appropriate steel members to which is welded a skeleton of wire mesh 50 (Fig. 4). This skeleton is lined with a layer of rubber 51 and with an inner lining of felt 52. The interstices of the skeleton are filled with acoustic plaster and it is then covered with a layer of felt 53, a layer of rubber 54, a further layer of felt 55, a further layer of rubber 56 and another layer of felt 57 and finally a layer of leatherette 58 and a coating of lacquer 59. This laminated wall construction provides a remarkably effective sound insulation for keeping the noises of the camera entirely within the device.

As shown in Fig. 3, the blimp is supported upon the base plate 14 to which it is secured by screws 15 in a peculiar and effective manner to prevent communication of vibration to the tripod. The body of the camera support 60 carrying ways 61 for the camera is secured to a metallic member 62 while the further metallic member 63 is secured to the base. An additional metallic element 64 corresponding in configuration to the spaces between the elements 62 and 63 is located mid-way between them and a layer of rubber is interposed between the base 14 and the member 64 and also between the member 63 and the member 64 while a similar layer of rubber is interposed between the member 64 and the camera supporting base 60 and the member 62, these rubber layers being indicated at 65.

The several control elements for the camera may be briefly described as follows:

The buttons 75 and 76 are used to insert appropriate filter glasses before the film in the camera. For example, the button 75 may be pressed to insert a panchromatic filter, and the button 76 for a blue filter.

The buttons 77 and 78 control the "dissolve" mechanism of the camera, 77 controlling the "dissolve in" and 78 the "dissolve out".

The knob 79 is rotatable to control the shutter-setting of the camera.

The knob 80, as shown in Fig. 5, controls the magnification of the focussing device of the camera through the gears 85 and 86 and the rack 87.

The handle 82, which is latched by the button 81, rotates the pinion 89 which coacts with the rack 88 to move the camera laterally from the "taking" position to the "focussing" position and vice versa.

We claim:

1. In a camera blimp having sound-proof walls, an upper portion of said blimp adapted to house a plurality of film reels and the driving means therefor, a door in said portion adapted to provide access to said driving means, a second door in said portion adapted to provide access to said reels, a second lower portion of said blimp housing said camera, said second portion having a door providing access to said camera, said door of said second portion being hinged to said second door of said first-mentioned portion, and a third portion of said blimp housing a motor for said camera, said third portion having a door therein adapted to permit removal of said motor.

2. In a camera blimp having a sound-proof wall, a lower portion of said blimp adapted to house a camera and the motor therefor, a door to permit removal of said camera and a second door to permit removal of said motor, and an upper portion of said blimp adapted to house the film reels for said camera, said upper portion having a door to provide access to said film reels, said door being hinged to said camera door to provide an unobstructed access to said camera when said doors are swung upwardly, and a second door to provide access solely to the driving means for said reels.

3. In a camera blimp having a sound-proof wall of soft outside material, an upper portion divided along a vertical plane into two sections, one of said sections being fixed and the other of said sections being adapted to be moved to obtain access to the interior of said portion, a lower portion divided along a vertical plane into one fixed section and one movable section and adapted to house a camera and motor therefor, said fixed lower section being integral with said upper fixed section and, said lower movable section being hinged to said upper movable section to provide unobstructed access to the camera.

4. A camera blimp in accordance with claim 3 in which said lower and upper portions have rounded corners in substantially all planes thereof.

5. In a camera blimp having a sound-proof wall comprising an upper elongated circular portion, a lower substantially rectangular portion, all of said portions having pronounced rounded edges along substantially all planes, said upper portion having a door hinged at the top of said portion, and said lower portion having a door hinged at the top thereof to the bottom of said door of said upper portion to provide unobstructed access to the interior of said blimp.

WILLIAM EGLINTON.
HARRY G. CUNNINGHAM.